US012035088B2

(12) United States Patent
Corten et al.

(10) Patent No.: US 12,035,088 B2
(45) **Date of Patent: *Jul. 9, 2024**

(54) SPEAKER CONFIGURATION AND HOUSING

(71) Applicant: Biamp Systems, LLC, Beaverton, OR (US)

(72) Inventors: Wim Willy J. Corten, Tessenderlo (BE); Christopher Matthew Barrow, Woodstown, NJ (US); Jake Chervin, Philadelphia, PA (US); Matthew Dore, Anywerpen (BE); Tok Doun, Beaverton, OR (US); Johan Frits Ploeg, Hillsboro, OR (US)

(73) Assignee: Biamp Systems, LLC, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/162,682

(22) Filed: Jan. 31, 2023

(65) Prior Publication Data

US 2023/0179897 A1 Jun. 8, 2023

Related U.S. Application Data

(63) Continuation of application No. 17/488,862, filed on Sep. 29, 2021, now Pat. No. 11,570,531.

(60) Provisional application No. 63/139,799, filed on Jan. 21, 2021.

(51) Int. Cl.
*H04R 1/02* (2006.01)

(52) U.S. Cl.
CPC .................................... *H04R 1/02* (2013.01)

(58) Field of Classification Search
CPC ........ H04R 1/345; H04R 1/021; H04R 1/323; H04R 2201/021; H04R 1/026; H04R 1/02; H04R 1/32; H04R 2201/025; H04R 1/06; H04R 1/025; H04R 1/2873; H04R 27/00; H04R 2205/021; H04N 5/642; Y10T 403/7033; Y10T 403/7032; Y10T 403/7026; F16M 11/08; F16M 13/02; F16M 11/043; F16M 2200/028; F16M 2200/024; A63B 2071/0658; A63B 2225/685; A63B 2071/0625
See application file for complete search history.

(56) References Cited

U.S. PATENT DOCUMENTS 7,036,781 B1 * 5/2006 Bothe .................... H04R 1/026 248/282.1
7,883,065 B2 * 2/2011 Nelson ............... F16M 11/2021 248/70
9,341,403 B2 * 5/2016 Conrad ..................... F25D 3/08
11,570,531 B2 * 1/2023 Corten ................... H04R 1/026
2003/0029975 A1 * 2/2003 Cowan .................. F16M 13/02 181/146

(Continued)

*Primary Examiner* — Carolyn R Edwards
*Assistant Examiner* — Julie X Dang

(57) ABSTRACT

An example apparatus includes a speaker housing with a recessed portion having a spring-loaded lip and a set of leads to provide power to the speaker when connected to a lead, and a lead interface plate external to the speaker housing with a set of leads to match the leads in the speaker housing, and when press-fitted into the recessed portion, provides a locked position with one side of the lead interface plate secured in front of the spring-loaded lip.

12 Claims, 4 Drawing Sheets

(56) References Cited

U.S. PATENT DOCUMENTS

| | | | | |
|---|---|---|---|---|
| 2003/0174855 | A1* | 9/2003 | Hawkins | H04R 1/02 381/386 |
| 2007/0075202 | A1* | 4/2007 | Gordon | H04R 1/026 248/292.12 |
| 2009/0161903 | A1* | 6/2009 | White | H04R 27/00 381/395 |
| 2010/0314514 | A1* | 12/2010 | Nelson | F16M 11/2021 248/218.4 |
| 2013/0251187 | A1* | 9/2013 | Sumitani | H04R 1/026 381/387 |
| 2014/0013789 | A1* | 1/2014 | Conrad | F25D 3/08 62/331 |
| 2016/0357091 | A1* | 12/2016 | Jacobsson | H02G 3/20 |
| 2020/0186901 | A1* | 6/2020 | Brousseau | F16B 2/18 |

* cited by examiner

SPEAKER CONFIGURATION AND HOUSING

CROSS-REFERENCE TO RELATED APPLICATION

This application is a continuation of U.S. non-provisional patent application Ser. No. 17/488,862, filed on Sep. 29, 2021, now U.S. Pat. No. 11,570,531, issued on Jan. 31, 2023, which claims priority to earlier filed U.S. provisional patent application No. 63/139,799, entitled "SPEAKER CONFIGURATION AND HOUSING" filed on Jan. 21, 2021, the entire contents of which are hereby incorporated by reference in their entirety.

BACKGROUND

Speakers and their installation on ceilings and walls and other places raises a degree of concern with how quickly they can be setup and secured. The wire connections of a speaker system require proper setup and proper expertise. Also, the subsequent security requirement to reduce the chances of theft are also a concern. 'Plug and snap' configurations that receive the speaker housing against a mounting surface of a wall mounted mount plate or other configuration are in existence but seldom address the majority of concerns with proper speaker installation and setup.

SUMMARY

One example embodiment may provide a device that includes a speaker housing with a recessed portion having a spring-loaded lip at one side and a set of leads to provide power to the speaker when form-fitted with a lead interface, and a lead interface external to the apparatus comprising a set of leads to match the leads in the speaker housing and when press-fitted into the recessed portion, provides a locked position with one side of the lead interface resting in front of the spring-loaded lip.

Another example embodiment includes a speaker housing with a recessed portion having a spring-loaded lip and a set of leads to provide power to the speaker when connected to a lead; and a lead interface plate external to the speaker housing comprising a set of leads to match the leads in the speaker housing and when press-fitted into the recessed portion, provides a locked position with one side of the lead interface plate secured in front of the spring-loaded lip.

Yet another example embodiment includes an apparatus that includes a speaker housing with a recessed channel that begins at a center of a top portion of the speaker housing and continues across a top of the speaker housing to a rear portion of the speaker housing and continues down a back side of the speaker housing and under a bottom portion of the speaker housing and ends at a center of the bottom portion of the speaker housing, and a removable U-shaped bracket flush-mounted into the recessed channel to create a continuously even surface when installed on the recessed channel.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide a speaker housing configuration that includes a securing mechanism that reduces the likelihood of theft, a press-connection plate and receiving interface, and a mount with the security mechanism, in one example, and a U-shaped bracket with a security mechanism as an alternative mounting option. The wire connections are hard-wired to a press-fitted plate which snaps into a spring-loaded lip of the receiving portion of the speaker housing.

Figure 1:
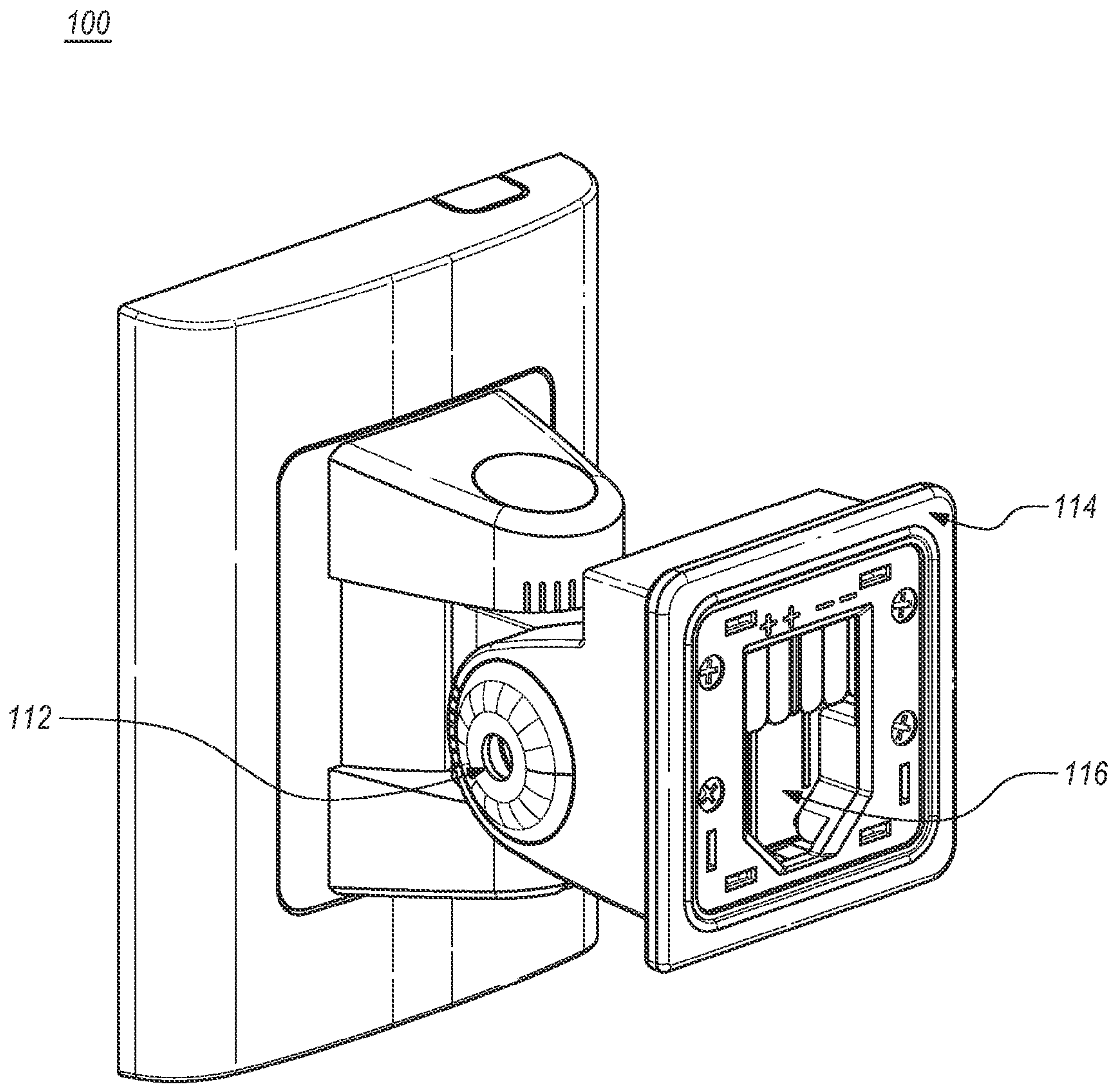
FIG. 1 illustrates a receiving bracket mount which provides a mount plate for a speaker according to example embodiments.

FIG. 1 illustrates a receiving bracket mount to provide a mount plate for a speaker housing according to example embodiments. Referring to FIG. 1, the configuration 100 is for a wall, ceiling or undermount area plate with an extending portion that includes a hex bolt or other adjustable securing mechanism 112 that permits angle modifications and which makes theft difficult without the correct tools to remove the speaker housing. Also, the angle of the receiving plate 114, includes a gasket, a hardwired two or four wire lead interface 116, and securing lips and/or grooves for providing a snug fit with the speaker housing. The securing lips or grooves may provide a form-fitted slot with the speaker receiving recess.

Figure 2:
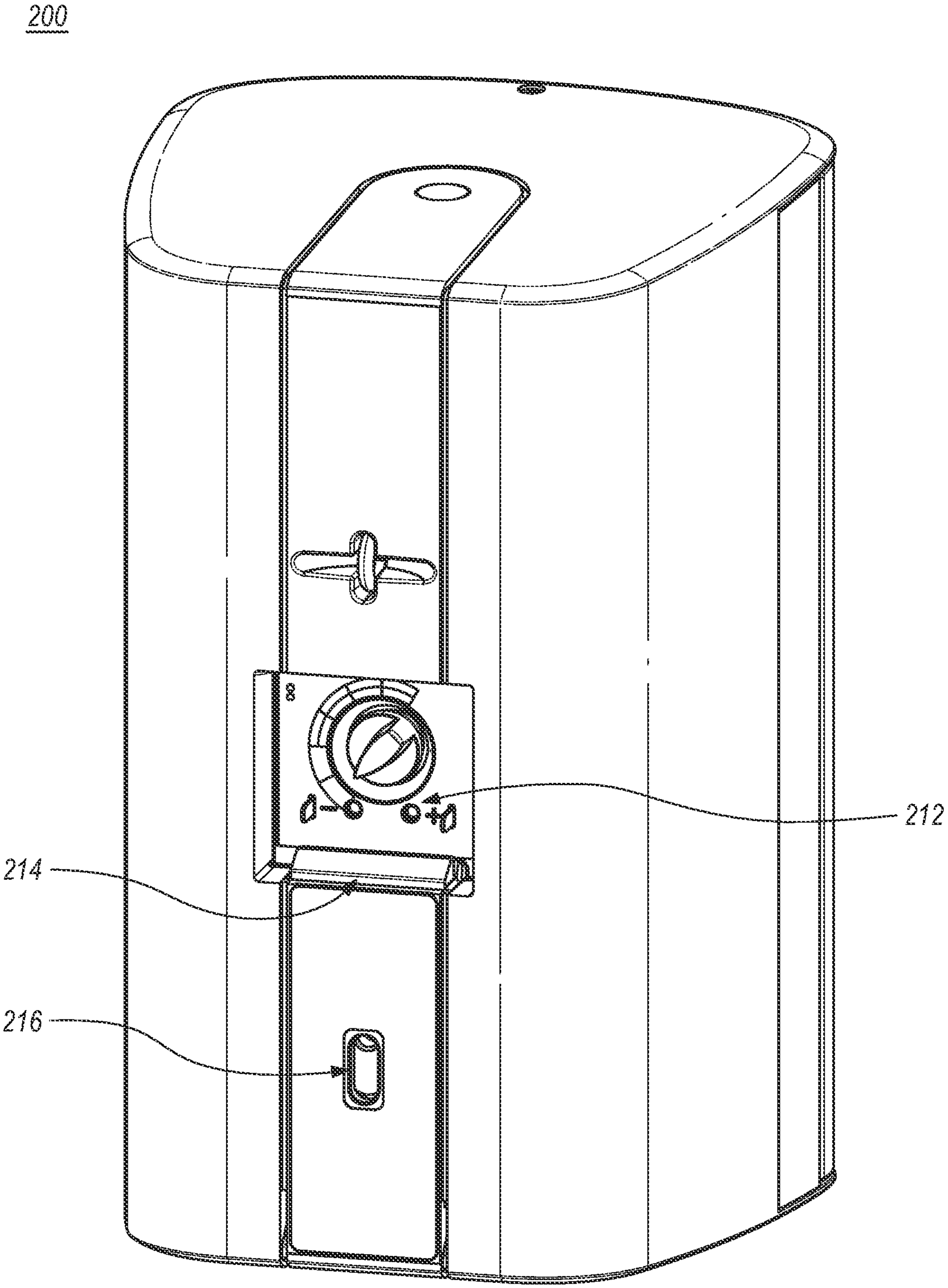
FIG. 2 illustrates a speaker housing with a security release mechanism and a plate installation interface according to example embodiments.

FIG. 2 illustrates a speaker with a security release mechanism and a plate installation interface according to example embodiments. Referring to FIG. 2, the speaker housing configuration 200 includes a receiving recess 212 with leads, form-fitted slots/protrusions and a spring-loaded lip 214 for securing the wall plate connection interface plate 114. The security release slot 216 is connected to a spring-loaded set of components (See FIG. 3) which are used to permit the lip 214 to move back and forth with a spring-loaded force and lock the received portion of the connection interface plate 114 of the mount 112 by one lip portion of the square or rectangular body of the interface plate 114. A similar design but different interface is included in the example of FIG. 4.

Figure 3:
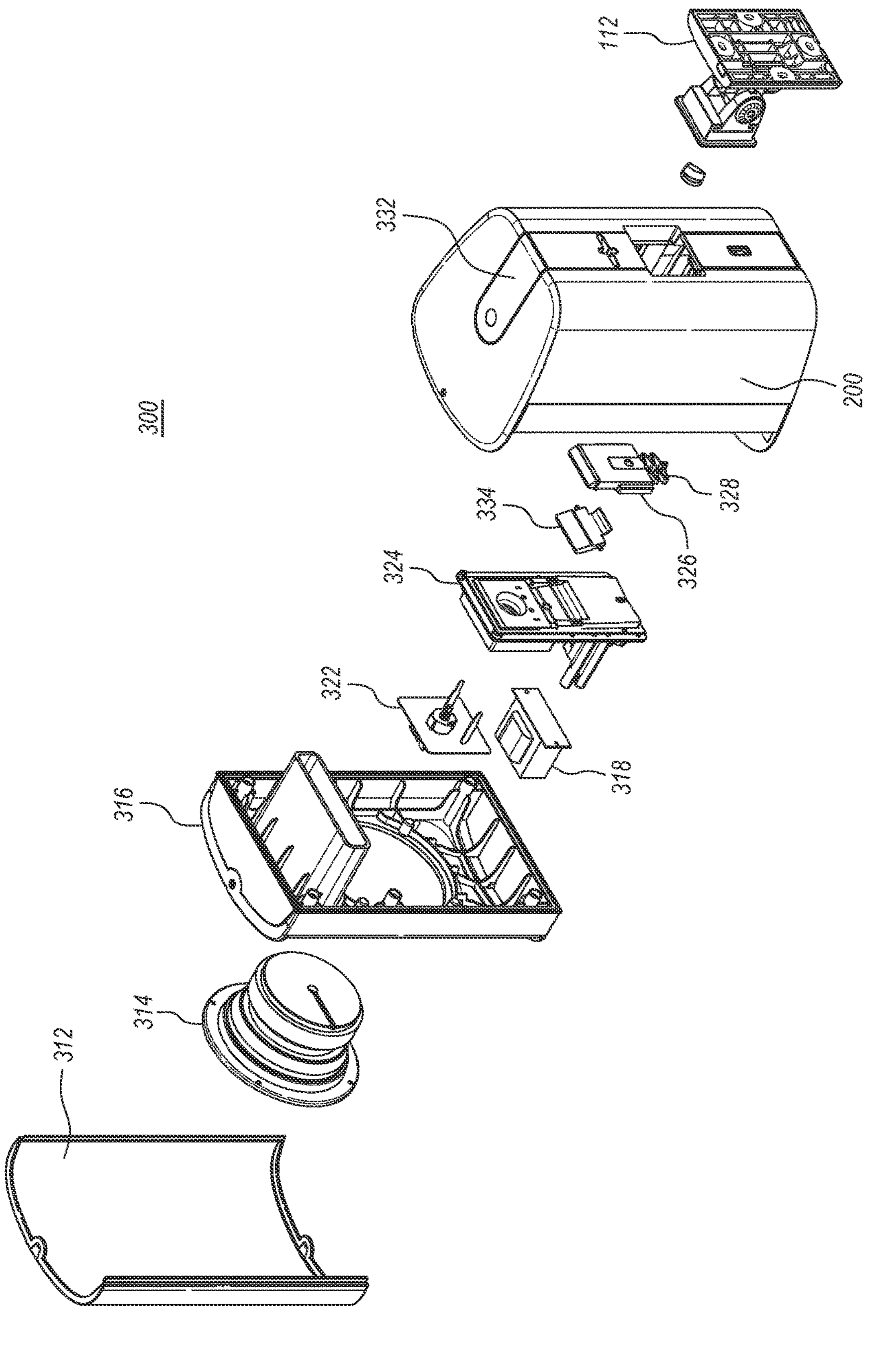
FIG. 3 illustrates an exploded view of a speaker, housing, mount and security spring mechanism according to example embodiments.

FIG. 3 illustrates an exploded view of a speaker, housing, mount and security spring mechanism according to example embodiments. In FIG. 3, the configuration 300 includes a outer housing body 312, a speaker 314, an internal speaker housing 316 with a pass-through slot for the speaker, a connector 322, a block 318, an interface block 324, a connection 334, a spring 328, a lip block 326 loaded on the spring and the speaker housing 200 with an optional flush mounted bracket cover 332 that rests flush with the housing body to aesthetically cover the recessed portion where the bracket would rest if the U-Shaped bracket is preferred over the wall mount 112.

Figure 4:
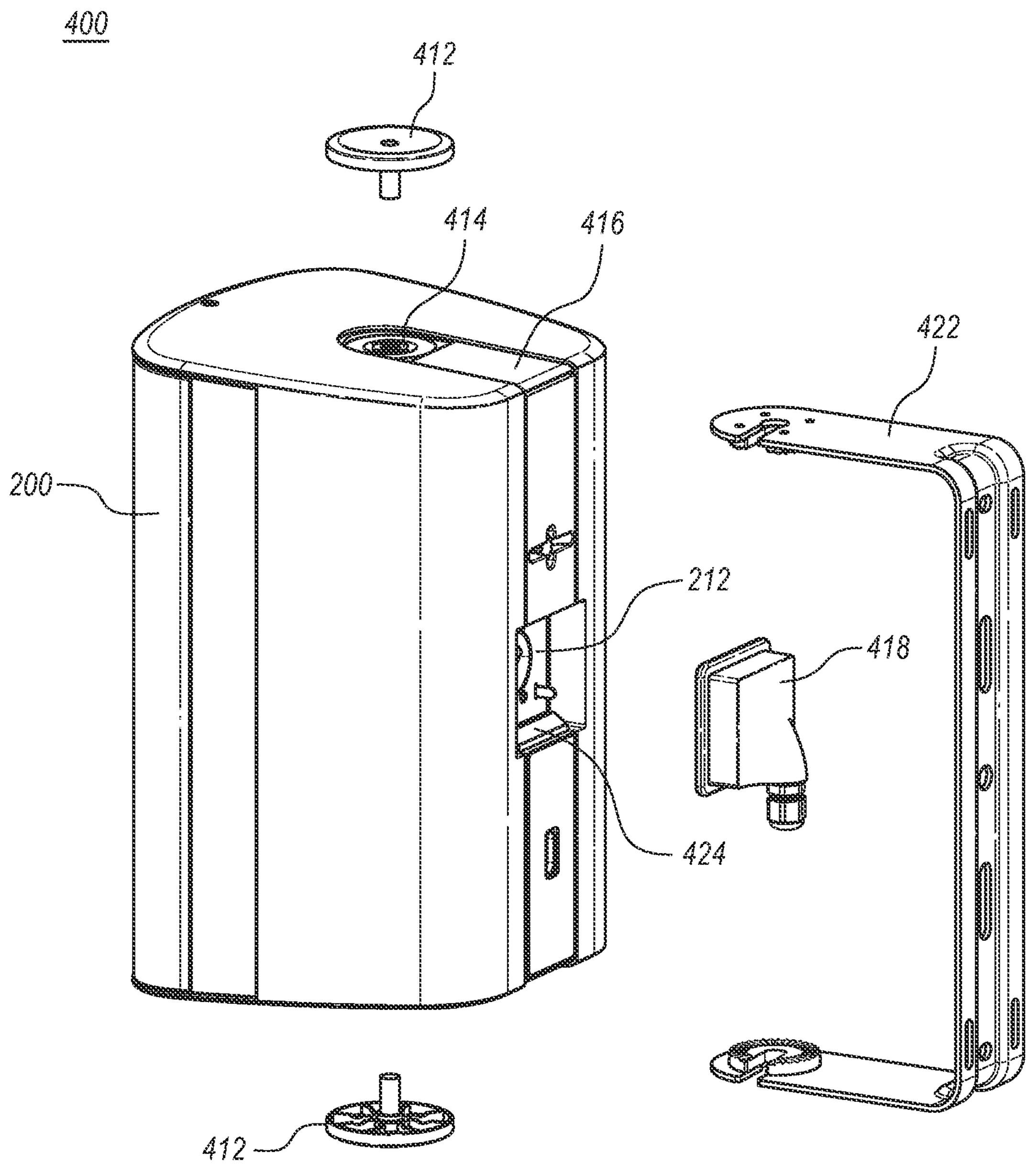
FIG. 4 illustrates an exploded view of a speaker, housing, and exterior mount portion according to example embodiments.

FIG. 4 illustrates an exploded view of a speaker, housing, and mount exterior portion according to example embodiments. Referring to FIG. 4, the configuration 400 includes a speaker housing 200 with a set of holes 414 on the top and bottom (not shown) which are threaded to received a bolt, such as a hex bolt or other bolt pair 412 to hold a U-shaped bracket 422 that rests against the recessed channel 416 on the top, bottom and side of the speaker. The wire lead and fitting interface 418 is similar to the one used by the wall mount and has edges which will be trapped by the spring-loaded lip 424 of the recessed interface.

One example may include a speaker housing with a recessed portion having a spring-loaded lip and a set of leads to provide power to the speaker when connected to a lead, and a lead interface plate external to the speaker housing comprising a set of leads to match the leads in the speaker housing and when press-fitted into the recessed portion, provides a locked position with one side of the lead interface plate secured in front of the spring-loaded lip. The number of leads may be two or four or more. The lead interface plate includes a rectangular or square shaped plate with a gasket outer lip and a recessed portion in a center of the lead interface plate. The speaker housing includes a recessed channel that begins at a center of a top portion of the speaker housing and continues across a top of the speaker housing to a rear portion of the speaker housing and continues down a back side of the speaker housing and under a bottom portion of the speaker housing and ends at a center of the bottom portion of the speaker housing. The recessed channel is approximately one to five centimeters wide and is less than one centimeter deep. The top portion includes a circular cavity to receive a circular fitting to secure a bracket to the housing. A U-shaped bracket is flush-mounted into the recessed channel to create a continuously even surface when installed on the recessed channel. A release actuator on a rear portion of the speaker housing permits a spring to be engaged to lower the spring-loaded lip so the speaker housing can be removed from the lead interface plate.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus, comprising:

a housing of a speaker with a recessed portion having a spring-loaded lip and a set of leads in the speaker housing to provide power to the speaker when connected to a lead; and a lead interface plate external to the speaker housing comprising a set of leads to match the set of leads in the speaker housing, and when press-fitted into the recessed portion, provides a locked position with one side of the lead interface plate secured in front of the spring-loaded lip wherein the speaker housing comprises a recessed channel comprising holes to receive bolts to hold a bracket that rests inside the recessed channel on the top portion and the bottom portion of the speaker housing.

2. The apparatus of claim 1, wherein the lead interface plate comprises a rectangular or square shaped plate with a gasket outer lip and a recessed portion in a center of the lead interface plate.

3. The apparatus of claim 1, wherein the recessed channel is approximately one to five centimeters wide and is less than one centimeter deep.

4. The apparatus of claim 1, wherein the top portion comprises a circular cavity to receive a circular fitting to secure a bracket to the speaker housing.

5. The apparatus of claim 1, wherein the bracket is a U-shaped bracket that is flush-mounted into the recessed channel to create a continuously even surface when installed on the recessed channel.

6. The apparatus of claim 1, comprising a release actuator on the backside portion that permits a spring to be engaged to lower a spring-loaded lip so the speaker housing can be removed from the lead interface plate.

7. An apparatus, comprising:

a speaker housing with a recessed portion having a spring-loaded lip and a set of leads in the speaker housing to provide power to the speaker when connected to a lead;

a lead interface plate external to the speaker housing comprising a set of leads to match the set of leads in the speaker housing, and when press-fitted into the recessed portion, provides a locked position with one side of the lead interface plate secured in front of the spring-loaded lip; and wherein the speaker housing comprises a recessed channel with a removable U-shaped bracket flush-mounted into the recessed channel.

8. The apparatus of claim 7, wherein the lead interface plate comprises a rectangular or square shaped plate with a gasket outer lip and a recessed portion in a center of the lead interface plate.

9. The apparatus of claim 7, comprising a release actuator on a rear portion of the speaker housing that permits a spring to be engaged to lower a spring-loaded lip so the speaker housing can be removed from the lead interface plate.

10. The apparatus of claim 7, wherein the number of leads comprises two or four.

11. The apparatus of claim 7, wherein the recessed channel is approximately one to five centimeters wide and is less than one centimeter deep.

12. The apparatus of claim 7, wherein the top portion comprises a circular cavity to receive a circular fitting to secure a bracket to the speaker housing.

* * * * *